US005195093A

United States Patent [19]
Tarrab et al.

[11] Patent Number: 5,195,093
[45] Date of Patent: Mar. 16, 1993

[54] METHOD AND APPARATUS FOR ENSURING CRC ERROR GENERATION BY A DATA COMMUNICATION STATION EXPERIENCING TRANSMITTER EXCEPTIONS

[75] Inventors: Moshe Tarrab, Holon; Yehuda Shaik, Ramat Gan; Eliezer Weitz, Holon, all of Israel

[73] Assignee: Motorola, Inc., Schaumburg, Ill.

[21] Appl. No.: 655,884

[22] Filed: Feb. 14, 1991

[51] Int. Cl.⁵ ............................................. G06F 11/00
[52] U.S. Cl. ........................................ 371/3; 371/49.1
[58] Field of Search ............... 371/3, 49.1, 49.2, 37.7, 371/27, 37.4, 37.1

[56] References Cited

U.S. PATENT DOCUMENTS

| | | | |
|---|---|---|---|
| 4,107,649 | 8/1978 | Kurihara | 371/3 |
| 4,462,102 | 7/1984 | Povlick | 371/49.2 |
| 4,567,595 | 1/1986 | Hedlund | 371/49.1 |
| 4,670,876 | 6/1987 | Kirk | 371/3 |
| 4,876,686 | 10/1989 | Sasaki et al. | 371/3 |
| 4,942,515 | 7/1990 | Marzucco et al. | 364/200 |

OTHER PUBLICATIONS

Motorola MC68605 X.25 Protocol Controller (XPC) Advance Information data sheet, MC68605/D (1987), at pp. 4-14 and 4-15.
Ramabadran, T. and Gaitonde, S., "A Tutorial on CRC Computations," IEEE Micro, vol. 8, No. 4, 1988, pp. 62-75.

Primary Examiner—Robert W. Beausoliel
Assistant Examiner—Phung My Chung
Attorney, Agent, or Firm—Paul J. Polansky; Maurice J. Jones

[57] ABSTRACT

A method for ensuring CRC error-generation by a data communication station after a transmitter exception such as an underrun whereby a parity bit is preset to a binary one, and toggled in response to successive binary ones of a serial bit stream. Each byte of the serial bit stream is transmitted sequentially. If a transmitter exception occurs, the byte before the exception is transmitted normally. However, only the first seven bits of the last byte are transmitted. The parity bit is sent as an eighth bit of the last byte, ensuring odd parity for the previous bit stream. Thereafter, a byte even parity is sent to assure that the overall message has odd parity. A receiving station interprets two consecutive bytes having the predetermined data pattern as the CRC, thus ensuring that the receiving station will reject the frame.

8 Claims, 4 Drawing Sheets

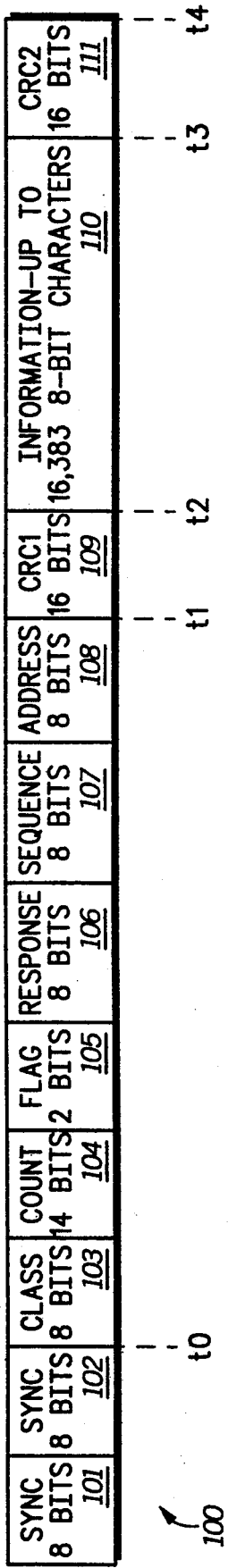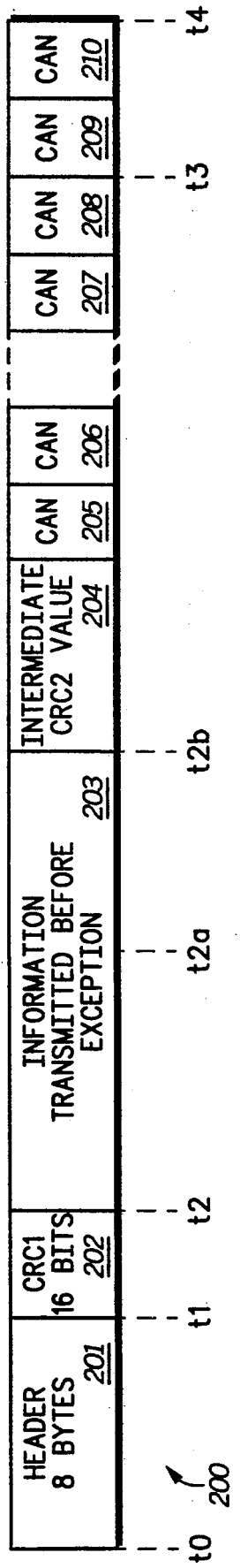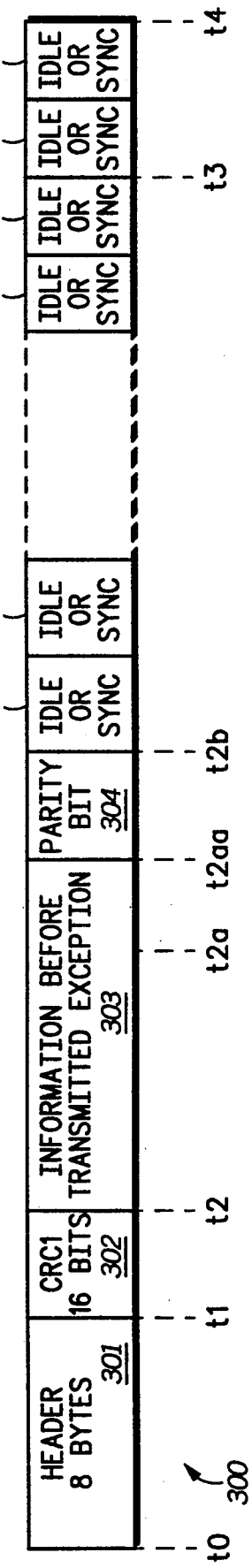

METHOD AND APPARATUS FOR ENSURING CRC ERROR GENERATION BY A DATA COMMUNICATION STATION EXPERIENCING TRANSMITTER EXCEPTIONS

FIELD OF THE INVENTION

This invention relates generally to data communication, and more particularly, to a method and apparatus for ensuring reliability in a data processing system implementing a data communication protocol.

BACKGROUND OF THE INVENTION

In the field of data communication, there are several known protocols for point-to-point or point-to-multipoint communication. One simple protocol suitable for low cost applications such as low speed terminal interfaces is an asynchronous protocol based on start- and stop-bit recognition and transmitted on standard RS-232 interfaces. One important consideration in the selection of a communication protocol is its ability to perform error detection and correction. Error detection is usually performed in the asynchronous start-stop protocol by appending a parity bit to the end of a transmitted data character. A transmitting station counts the number of binary ones in the character. In a system with even parity, if the number of binary ones in the character is odd, the parity bit is set to a binary one to make the total number even. In a system with odd parity, if the number of binary ones in the character is even, the parity bit is set to a binary one to make the total number odd. On receipt of the character and the parity bit, a receiving station then adds the total number of binary ones to determine whether the parity is correct. If an even number of ones is detected for a character in a data communication system with odd parity, the receiving station can then infer that an error during transmission. In most communication systems, a noise burst typically lasts long enough to cause several bits to be received erroneously. If the noise burst occurs in such a way as to maintain either an even or an odd number of binary ones during the noise burst, then the receiving station will fail to detect the error. Thus, the noise characteristics of communication systems decreases the usefulness of error detection using parity.

Another important consideration is the ability to transfer data unrestricted, a characteristic known as transparency. In order to set up, maintain, and terminate a communication link, transmitting and receiving stations recognize predetermined characters known as control characters. However, transparency requires that the data transmitted by one station is the same data received by another station. Some characters of data may be identical to the control characters. However, the communication protocol must recognize the character as data, and not as a control character. There are two major methods of solving the transparency problem.

The first method is based on transmitting control characters within the data stream. For example, high speed data link control (HDLC) protocol uses a zero insertion and deletion procedure to provide control character recognition. In HDLC protocol, a control character known as a "flag" includes a binary zero, followed by six binary ones, followed by another binary zero. A transparency problem may arise if a data character has the same pattern of binary ones and zeros. A transmitting station with such a character to send, however, inserts a binary zero after the fifth binary one. In general, the transmitting station inserts a binary zero after any sequence of five binary ones to transmit. The receiving station deletes a binary zero which occurs after any five consecutive binary ones. By following such a convention, the receiving station can thus determine a true flag control character by recognizing a sixth consecutive binary one.

If a transmitter exception occurs, requiring the frame transmission to be aborted, the transmitter sends a special character to signal the receiving station that the exception has occurred and the frame transmission has been aborted. In HDLC protocol, the character is known as an "ABORT" character. In binary synchronous (BISYNC) protocol, a character known as data link escape or "DLE" is sent. Thus protocols using the first method ensure data transparency and correctly interpret the data stream by complicated procedures.

The second method solves the transparency problem without zero insertion and deletion in the data stream, by keeping track of the character count. A data packet includes a fixed length header field, followed by data characters which form an information field, and is usually terminated by a frame check sequence. The header provides control information, and includes a character count field which specifies the number of characters in the information field. The principal advantage of protocols using the character count method is simplicity in ensuring data transparency. A widely-used protocol that applies the byte count method is digital data communication message protocol (DDCMP).

For higher speed applications protocols such as HDLC and DDCMP are more useful than the asynchronous start-stop protocol. FIG. 1 illustrates a timing diagram of a DDCMP data frame 100 known in the prior art. The DDCMP frame format is well-known and is described in detail in McNamara, John, *Technical Aspects of Data Communication*, 3d ed., Digital Press, Bedford, Mass., 1988. FIG. 1 depicts bit fields of the DDCMP frame along a time dimension in the horizontal direction, with the bit fields being received or transmitted sequentially from left to right. Before the start of the frame at a time labelled "t0", the transmitting station sends two synchronization characters 101 and 102 to alert the receiving station of the occurrence of the frame. Between time t0 and a time labelled "t1", the station transmits a portion of the frame known as a header. Between time t1 and a time labelled "t2", the station transmits a cyclic redundancy check sequence known as "CRC1" 109. Between time t2 and a time labelled "t3", the station transmits an information field 110, which has up to 16,383 8-bit characters. Between time t3 and a time labelled "t4" the station transmits a cyclic redundancy check sequence known as "CRC2" 111.

The header field has several subfields 103 including an 8-bit CLASS subfield, a 14-bit COUNT subfield 104 a 2-bit FLAG subfield 8-bit RESPONSE, SEQUENCE, and ADDRESS subfields 106, 107 and 108, respectively. The use of the various subfields in the header field are well known, but COUNT subfield 104 is especially important. In the DDCMP protocol, which is a byte-count protocol, COUNT subfield 104 specifies the number of information bytes to be sent. COUNT subfield 104 allows the receiving station to determine when CRC2 field 111, following information field 110 is expected. CRC2 field 111 helps to determine whether an error occurred during transmission of the information portion of the message. In the DDCMP protocol, CRC1 field 109 and CRC2 field 111 are conventional CRC-16 cyclic redundancy checks performed on their respective fields. Cyclic redundancy checks are used in many higher performance protocols because they ensure a very low probability that a noise burst on a stream of transmitted data will not be detected by a receiving station.

Integrated circuit devices which implement various protocols and perform error detection are commercially available. Devices known as UARTs, which implement the asynchronous start-stop protocol, have long been commercially available. Integrated circuit devices that perform such protocols as HDLC, DDCMP, and binary synchronous (BISYNC) protocols are relatively newer. Several commercial integrated circuit devices include multiple protocol communication channels. For example, one type of programmable communication channel commonly known as a serial communication controller (SCC) may be programmed to implement a variety of communication protocols, such as the asynchronous start-stop protocol, HDLC, DDCMP, and binary synchronous protocol (BISYNC).

A communication station or node may be formed by combining an SCC with a data processor to program the SCC and a memory to store the program. One or more SCCs may also be combined with the data processor and peripherals to provide a communication station on a single integrated circuit. See the Motorola Inc. MC68302 Integrated Multi-Protocol Processor User's Manual, MC68302UM/AD, 1989. The data processor must program the SCC in a manner prescribed by the communication protocol being operated. In addition, the data processor must provide the data to transmit, and store and process received data. If the data processor fails to provide data to the SCC quickly enough during transmission, an exception known as a transmitter underrun occurs. The SCC must be able to respond to the transmitter exception in a way that ensures reliable operation of the protocol. During DDCMP mode of operation, if an exception occurs during transmission, the SCC must ensure that the appropriate field, CRC1 or CRC2, is incorrect to ensure that the receiving station will see the frame as erroneous and discard it. However, as communication functions performed by different devices in a data processing system change, new ways of performing protocols which deal with errors encountered in the data processing system must be developed.

SUMMARY OF THE INVENTION

Accordingly, there is provided, in one form, a method for ensuring CRC error generation by a data communication station experiencing a transmitter exception during a transmission of a frame, the frame having a predetermined number of data bytes. The method includes the steps of presetting a parity bit to a binary one, the parity bit toggled in response to each successive binary one transmitted by the data communication station; transmitting the data bytes of the frame sequentially from a first data byte to a next-to-last data byte, said next-to-last data byte occurring immediately before a last data byte during which the transmitter exception occurs; transmitting a first seven data bits of the last data byte in place of an eighth bit of said last data byte; transmitting the parity bit; and transmitting continuously a predetermined character having even parity until a total number of bytes transmitted is equal to the predetermined number of data bytes plus two, a last two characters providing an erroneous CRC.

In another form, there is provided a communication controller of a data communication station implementing a predetermined protocol. A first-in, first-out memory has a data input for receiving input data, a data output, and a control output port for indicating an underrun condition. A parallel-to-serial shift register has an input coupled to the data output of the first-in, first-out memory, and an output. A parity bit generator has a data input coupled to the output of the parallel-to-serial shift register, a preset input for receiving a preset signal, and an output. A multiplexer has a first input coupled to the output of the parity bit generator, a second input coupled to the output of the parallel-to-serial shift register, a control input terminal for receiving a data/parity signal, and an output for providing a transmit data output signal. A controller is coupled to the first-in, first-out memory, to the parity bit generator, and to the multiplexer, and provides the preset signal to the parity bit generator at a beginning of a predetermined portion of a frame, and provides the data/parity signal to select the first input of the multiplexer during an eighth bit of a byte in response to the first-in, first-out memory indicating the underrun condition.

These and other objects, features and advantages will be more clearly understood from the following detailed description taken in conjunction with the accompanying drawings.

BRIEF DESCRIPTION OF THE DRAWINGS

FIG. 1 illustrates a timing diagram of a DDCMP frame known in the prior art.

FIG. 2 is a timing diagram which illustrates a known method of transmitting DDCMP frame aborted by a transmitter exception.

FIG. 4 is a timing diagram which illustrates a method of transmitting a DDCMP frame aborted by a transmitter exception in accordance with the present invention.

DETAILED DESCRIPTION OF THE INVENTION

Figure 3:
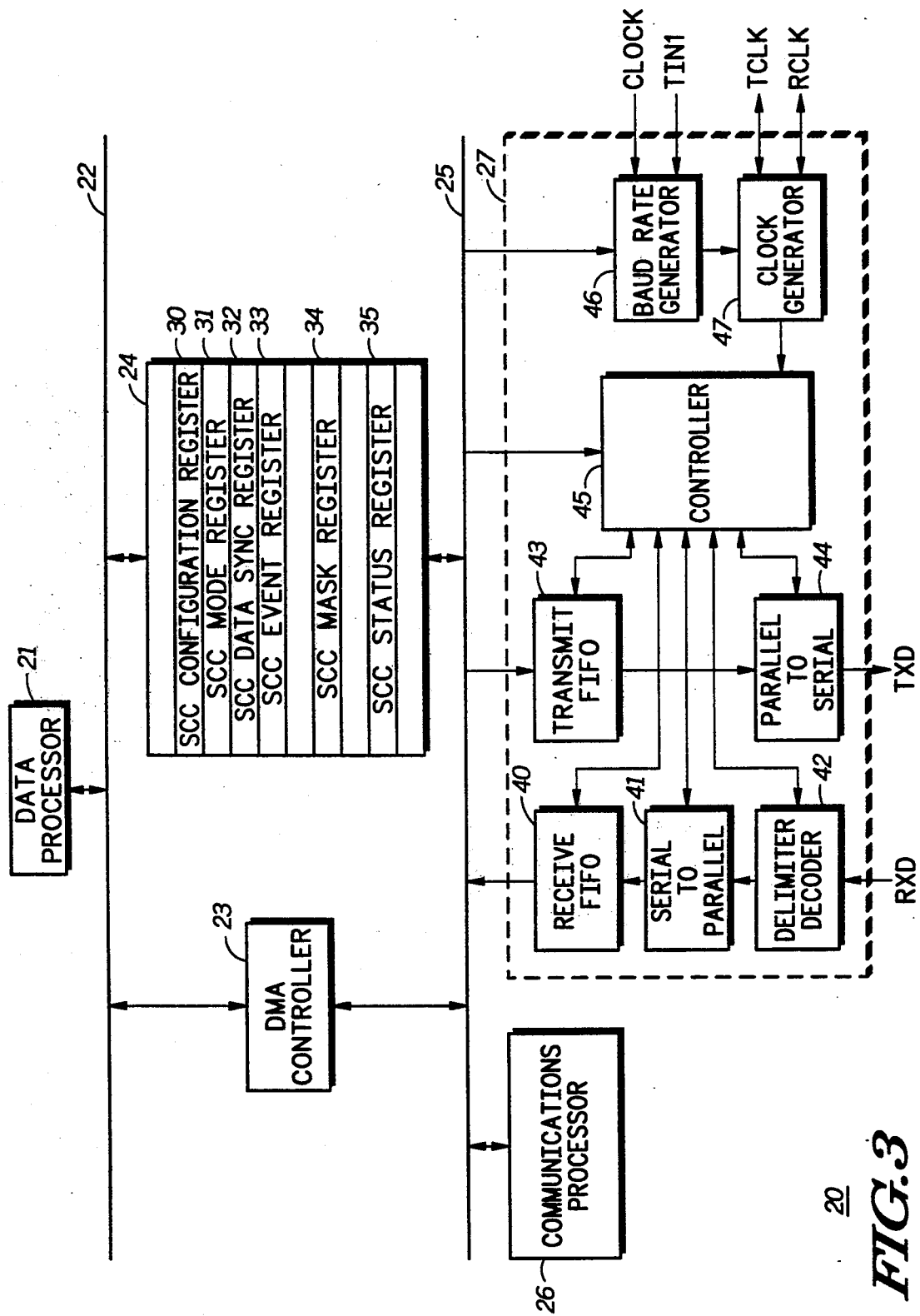
FIG. 3 illustrates in block form a data processing system incorporating an SCC.

FIG. 2 is a timing diagram which illustrates a known method of transmitting DDCMP frame aborted by a transmitter exception. In FIG. 2, time points analogous to time points of FIG. 1 are similarly designated. As in FIG. 1, a DDCMP frame 200 being transmitted in FIG. 2 begins at time t0. Between time t0 and t1, a header field 201 is transmitted, followed by a CRC1 field 202 between t1 and t2. A valid information field 203 is transmitted between time t2 and a time labelled "t2b". Before all valid information bits are transmitted, a transmitter exception such as a transmitter underrun occurs at a time labelled "t2a". The transmitter exception prevents any more valid data from being transmitted beyond time t2b. Since the DDCMP protocol is a byte-count protocol, the receiving station expects to receive the number of bytes specified in the COUNT subfield. Thus, at the end of the specified number of bytes, the receiving station interprets the next 16 bits as being the CRC2 field.

When the exception occurs at time t2a, the station must act in such a way to ensure that an incorrect CRC2 is transmitted, so that the receiving station will detect the error in the frame. If the station does not ensure an incorrect CRC2, then a randomly-generated CRC2 may occasionally indicate correct data to the receiving station. If the exception is occasionally not detected by the receiving station, a reliability problem results. A known method to ensure that a CRC2 error is detected in the receiving station is to transmit a correct intermediate CRC2 204 for the data received correctly before the exception. Thereafter, until the end of the information field, a predetermined character known as a "CAN" character having a value of 18 hexadecimal is transmitted. In frame 200, six CAN characters 205–210 are illustrated. As long as the number of bytes remaining to be transmitted is less than 32767 ($2^{15}-1$) bits, an erroneous CRC is guaranteed. In the DDCMP protocol, this requirement is always met because the header length is six bytes, and information field is limited to 16,383 ($2^{14}-1$) bits.

However, this method of ensuring that an incorrect CRC is generated assumes that an intermediate CRC2 is available to be transmitted when a transmitter exception occurs. This assumption is met when the CRC2 is generated in hardware by circuitry internal to the SCC. In some architectures, however, an external data processor calculates and appends the CRC2 to the end of the header or information fields. If a transmitter exception results from a transmitter underrun, for example, the data processor has not been able to supply data fast enough to the SCC, and is unlikely to supply the intermediate CRC2 quickly enough as well. Thus, it is not possible to implement this method in architectures in which an intermediate CRC2 is not available to the SCC.

FIG. 3 illustrates in block form a data processing system 20 incorporating an SCC. Data processing system 20 includes a data processor 21, a processor bus 22, a direct memory access (DMA) controller 23, a dual-ported memory 24, a peripheral bus 25, a communication processor 26, and an SCC 27. Dual-ported memory 25 has several registers including a register 30 labelled "SCC CONFIGURATION REGISTER", a register 31 labelled "SCC MODE REGISTER", a register 32 labelled "SCC DATA SYNC REGISTER", a register 33 labelled "SCC EVENT REGISTER", a register 34 labelled "SCC MASK REGISTER", and a register 35 labelled "SCC STATUS REGISTER". SCC 27 includes a receive first-in, first-out memory (FIFO) 40, a serial to parallel conversion block 41, a delimeter decoder 42, a transmit FIFO 43, a parallel to serial conversion block 44, a controller 45, a baud rate generator 46, and a clock generator 47.

In data processing system 20, data processor 21 is a conventional data processor coupled to processor bus 22 which executes program instructions from a memory also coupled to processor bus 22 (not shown). Data processor 21 programs registers in dual-ported RAM 24 associated with SCC 27 to properly implement a selected protocol, including asynchronous start-stop protocol, HDLC, BISYNC, and DDCMP. Data processor 21 is also responsible for providing transmit data to, and reading receive data from, dual-ported memory 24. Dual-ported memory 24 has a first port coupled to processor bus 22, and a second port coupled to peripheral bus 25. The transmit or receive data is passed to and from SCC 27 through several buffer descriptors located in dual-ported RAM 24. Each buffer descriptor has fields which indicate a status of the data associated therewith, a data length field, and a pointer to an associated data buffer. The associated data buffer stores some or all of the information portion of the frame and is located either in another portion of dual-ported memory 24, or in the external memory. DMA controller 23 is coupled both to processor bus 22 and to peripheral bus 25, and provides one DMA channel from the receiver of SCC 27 to dual-ported RAM 24 or the external memory, and one DMA channel from dual-ported RAM 24 or the external memory to the transmitter of SCC 27. Communication processor 26, coupled to peripheral bus 25, is a microcoded data processor which controls the activities in SCC 27 and programs DMA controller 23.

SCC 27 is shown as including several registers programmed by data processor 21 which are illustrative of the programming and operation of the SCC. SCC MODE REGISTER 31 specifies the protocol to be performed by SCC 27, including asynchronous start-stop protocol, HDLC, BISYNC, and DDCMP. SCC MODE REGISTER 31 includes several subfields such as the minimum number of synchronization characters transmitted between frames and the choice of whether to transmit user-defined synchronization characters or an "IDLE" character between frames. SCC CONFIGURATION REGISTER 30 relates to the setup of the physical interface and includes subfields specifying a clock divider and whether to use an external clock or internal baud rate generator 46. SCC DATA SYNC REGISTER 32 allows the user to program two data synchronization characters which are transmitted in pairs between frames. For example, a synchronization character recognized as the DDCMP SYNC character, having a value of 96 hexadecimal, may be programmed as both synchronization characters. SCC EVENT REGISTER 33 and SCC MASK REGISTER 34 provide a mechanism for informing data processor 21 of the pendency of an interrupt event, including the transmitter underrun and clear-to-send (CTS) lost transmitter exceptions. SCC STATUS REGISTER 35 stores information about the status of the communication interface.

In SCC 27, baud rate generator 46 receives two clock input signals including a main clock signal labelled "CLOCK", and a separate external clock signal labelled "TIN1". Baud rate generator 46 is coupled to peripheral bus 25 to receive setup information from, and to optionally divide either clock signal by the clock divider stored in SCC CONFIGURATION REGISTER 30. Clock generator 47 is coupled to two bidirectional clock signal lines labelled "TCLK" and "RCLK". Signals TCLK and RCLK are clock signals which may be received as inputs from, or provided as outputs to, the communication line according to the programmed protocol. Clock generator 47 is coupled to baud rate generator 46, from which it receives a divided clock signal if programmed by SCC CONFIGURATION REGISTER 30. In turn, clock generator 47 is coupled to controller 45 to provide clocking information.

SCC 27 has two main portions: a receiver portion, including receive FIFO 40, serial to parallel conversion block 41, and delimiter decoder 42; and, a transmitter portion including transmit FIFO 43, and serial to parallel conversion block 44. Controller 45 is coupled to each block in both the receiver and transmitter portions and controls the operation of the receiver and transmitter portions according to programmable options in various registers in dual-ported RAM 24.

The receiver operation may be outlined as follows. Delimiter decoder 42 receives a data signal labelled "RXD" from the communication line. If delimiter decoder 42 detects a predefined pattern (such as two SYNC characters in the DDCMP protocol), a frame start is recognized. Subsequently, data is passed serially to serial-to-parallel conversion block 41 for assembly into 16-bit characters. Serial-to-parallel conversion block 41 provides each assembled character to receive FIFO 40. Receive FIFO 40 stores three 16-bit words, which are subsequently placed in data buffers located either in dual-ported RAM 24 or in the external memory. The transmitter operates as follows. Transmit FIFO 43 receives up to three 16-bit words of data from a data buffer located either in dual-ported memory 24 or in the external memory. Parallel to serial conversion block 44 receives data, one 16-bit word at a time, from transmit FIFO 43 and transmits the data sequentially on a signal labelled "TXD" one bit at a time.

If the DDCMP protocol is chosen, a conventional CRC-16 error check is performed to provide the CRC1 and CRC2 fields. There are at least two ways to calculate the CRC-16 error check. First, the CRC-16 field may be calculated by circuitry located in serial to parallel conversion block 41 and parallel to serial conversion block 44 in the receiver and transmitter, respectively. Second, the CRC-16 field may be calculated by a microcode routine executed by communication processor 26 as data is either read from receive FIFO 40, or provided to transmit FIFO 43. Several factors make the second way optimal for data processing system 20. Dedicated hardware to perform the CRC-16 error checking consumes a large amount of integrated circuit space. Data processing system 20 includes two other SCCs not shown in FIG. 3, which may also require calculation of CRC-16 or other CRC fields. Communication processor 26 is a microcoded data processor including an arithmetic logic unit (ALU), which is ideally suited to calculate a CRC field with little additional circuit area. Thus, the CRC-16 field is optimally calculated by communication processor 26.

However, another problem arises when communication processor 26 calculates the CRC-16 field in the DDCMP protocol. Referring again to FIG. 2, the known method to ensure that an incorrect CRC-16 is transmitted after the occurrence of a transmitter exception requires an intermediate CRC-16 value to be available immediately after a transmitter exception at time t1b. Since it calculates the CRC-16 field, communication processor 26 cannot provide the CRC-16 field on the occurrence of a transmitter exception in time for the transmitter to send it according to the known method for ensuring an incorrect CRC-16. Thus, in order to ensure reliable operation of the DDCMP protocol in data processing system 20, a new method of ensuring an incorrect CRC-16 value after a transmitter exception is necessary.

FIG. 4 is a timing diagram which illustrates a method of transmitting a DDCMP frame 300 aborted by a transmitter exception in accordance with the present invention. While FIG. 4 illustrates a timing diagram of a DDCMP frame 300, it will become apparent from the following discussion that the method applies as well to any protocol having a CRC generator polynomial with an even number of terms, since a CRC generator polynomial with an even number of terms has even parity. In FIG. 4, the exception occurs during an information field 303 of frame 300. Time points analogous to time points in FIGS. 1 and 2 are similarly labelled. A header field 301 of DDCMP frame 300 is transmitted between times t0 and t1. A CRC1 field 302 is transmitted between times t1 and t2. A transmitter exception is encountered at time t2a. Correct information is transmitted between time t2 and a time labelled "t2aa". Time t2aa represents the end of transmission of the seventh bit of a byte being transmitted when the transmitter exception occurs. Between time t2aa and time t2b, a single parity bit is transmitted. At time t0 the parity bit is preset to a binary one, then is toggled in response to each binary one transmitted in the information portion of the frame, from time t2 to time t2aa. After time t2b, either "IDLE" or SYNC characters are transmitted until the number of data bytes between times t2 and t3 is equal to COUNT. In frame 300, IDLE or SYNC characters 305–310 are illustrated. Following time t3, at least two additional IDLE or SYNC characters 309 and 310, are transmitted. In the receiving station, the two characters received between times t3 and t4 are interpreted as the CRC2 field. The characteristics of the CRC-16 are such that the transmission of the parity bit between times t2aa and t2b, followed by the predetermined characters between times t2b and t4, ensure that a CRC error will be detected at the receiving station. In addition, this method ensures that an invalid CRC is recognized at the receiving station for any byte count protocol relying on a CRC field with particular characteristics.

One mathematical way of expressing a digital message of length k bits is by means of a binary polynomial of degree $(k-1)$. A binary polynomial is a polynomial with coefficients taken from the binary field (having the value of either 0 or 1). For example, the bit sequence (10100101) has a length k of 8, and may be represented by the polynomial $(X^7+X^5+X^2+1)$. In a data communication system which applies a cyclic redundancy check (CRC) for error detection, a transmitted message, denoted M(X), includes a data sequence followed by an associated frame check sequence (FCS). The FCS is generated upon transmission by a polynomial division technique, such that the message polynomial M(X) is a multiple of a certain polynomial known as a generator polynomial G(X). The generator polynomial of a CRC is chosen in a way that enables the detection of a large class of errors. One of the principal properties of most communication protocols using a CRC FCS is that the CRC detects all odd number of bit errors in a transmitted message by choosing a generator polynomial divisible by $(X+1)$. As a result, M(X), being divisible by G(X), is also divisible by $(X+1)$. A binary polynomial which is divisible by $(X+1)$. means that the polynomial has an even number of terms; alternatively, a polynomial having an even number of terms is divisible by $(X+1)$. To illustrate, consider a sequence of bits represented by a polynomial labelled F(X), and assume F(X) is divisible by $(X+1)$. Thus, $$F(X)=(X+1)*Q(X) \qquad [1]$$

Substituting $(X=1)$ yields a modulo 2 summation of the bit sequence:

$$F(1)=(1+1)*Q(1)=0 \qquad [2]$$

since the calculation is done in modulo 2 and addition is done with no carries (equivalent to an exclusive-OR operation). Therefore, F(X), which is divisible by (X+1), must have an even number of terms. Hence, any message with an odd number of binary ones will be detected as erroneous if the generator polynomial has a factor of (X+1). Also, note that a polynomial of the form ($X^C+1$) has a decomposition factor of (X+1) since $$X^C+1 = (X+1)*(X^{C-1}+X^{C-2}+\ldots+1) \qquad [3]$$

Therefore, a binary polynomial is divisible by (X+1) if and only if the polynomial has an even number of terms.

TABLE I illustrates several known CRC polynomials with a factor of (X+1):

TABLE I

| CRC Name | Generator Polynomial |
|---|---|
| CRC-16 | $X^{16} + X^{15} + X^2 + 1 =$ $(X + 1)*(X^{15} + X + 1)$ |
| CRC-CCITT | $X^{16} + X^{12} + X^5 + 1 =$ $X^{12}*(X^4 + 1) + (X^5 + 1)$ |
| CRC-16 REVERSE | $X^{16} + X^{14} + X + 1 =$ $(X + 1)*(X^{15} + X^{14} + 1)$ |
| SDLC REVERSE | $X^{16} + X^{11} + X^4 + 1 =$ $X^{11}*(X^5 + 1) + (X^4 + 1)$ |
| CRC-12 | $X^{12} + X^{11} + X^3 + X^2 + X + 1 =$ $(X + 1)*(X^{11} + X^2 + 1)$ |
| LRCC-16 | $X^{16} + 1$ |
| LRCC-8 | $X^8 + 1$ |

Since the common CRC generator polynomials listed in TABLE I each are divisible by (X+1), and thus have even parity, the method of the present invention is applicable to protocols using any of these common CRCs.

Figure 5:
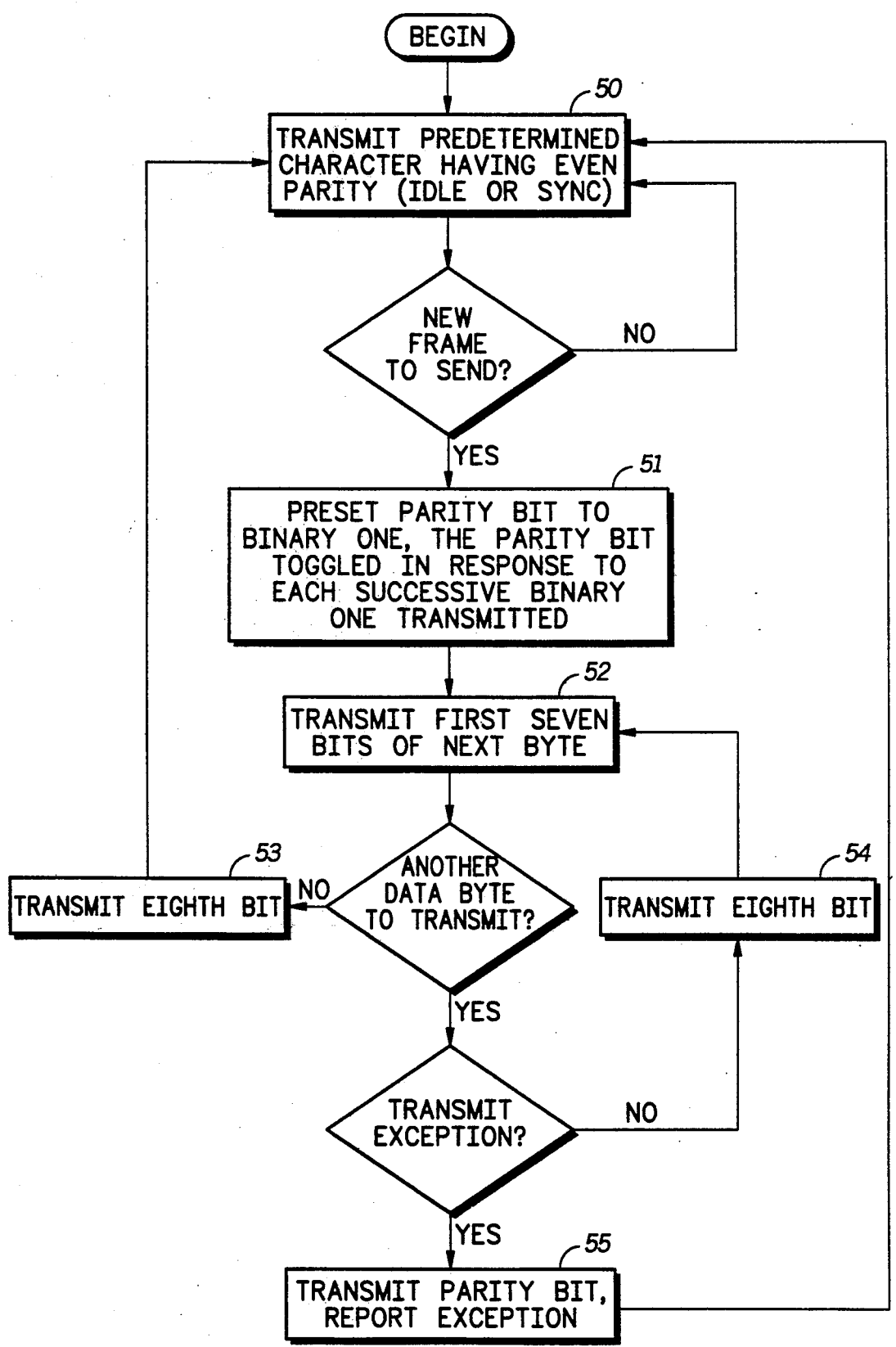
FIG. 5 illustrates a flow chart of the method of the present invention.

FIG. 5 illustrates a flow chart of the method of the present invention. At step 50, a parity bit is preset to a binary one. The parity bit is toggled in response to each successive binary one. Thus, if an even number of binary ones is encountered in the transmitted portion of the frame's information field (as shown between times t2 and t2aa in FIG. 4), the parity bit will force odd parity for the whole message. A transmitter exception is checked before each byte is sent. If no transmitter exception is encountered, then another byte is sent in step 52. If no byte remains, then a correct CRC2 is transmitted in step 51. Thus, step 51 represents termination of a frame during the transmission of which no transmitter exceptions were encountered. If a transmitter exception occurs, then step 53 specifies transmitting of a first seven bits of the next byte. Subsequently, at step 54, the parity bit is transmitted. If the COUNT field has not been decremented to zero, then a predefined character with an even number of binary ones is transmitted at step 56. Data processor 20 of FIG. 3 may programmably transmit either an IDLE ('FF' hexadecimal) or SYNC ('96 hexadecimal) character, both of which have an even number of binary ones. However, in other protocols and with other implementations of the DDCMP protocol, other characters with even numbers of binary ones may also be sent. When the total number of bytes transmitted in the information field equals COUNT (between times t2 and t3 in FIG. 4), at least two of the predefined characters are transmitted. Thus the IDLE or SYNC character (having even parity) is transmitted continuously until the total number of bytes transmitted in greater than or equal to COUNT plus two. The two final predetermined characters are recognized as the CRC by the receiving station. Since the method ensures the information field has odd parity, the receiving station will always recognize an incorrect CRC (assuming no random noise burst in such a way that the predetermined character then becomes the correct CRC).

Referring again to FIG. 4, it is important to note that although the exception at time t2a occurs during the information portion of the frame, the method applies as well to an error occurring during the header portion of the frame. Each DDCMP frame may be understood as including two different autonomic frames, where an autonomic frame is defined as a frame with an arbitrary bit sequence followed by a cyclic redundancy check sequence. The first autonomic frame is the header field followed by CRC1, whereas the second autonomic frame is the information field followed by CRC2. Since both CRC1 and CRC2 use the CRC-16 generator polynomial, they ensure that each autonomic frame has even parity (absent error). Thus, if the parity bit is preset to a binary one at time t0, it will also be a binary one at time t2, and need not be preset again at time t2.

Figure 6:
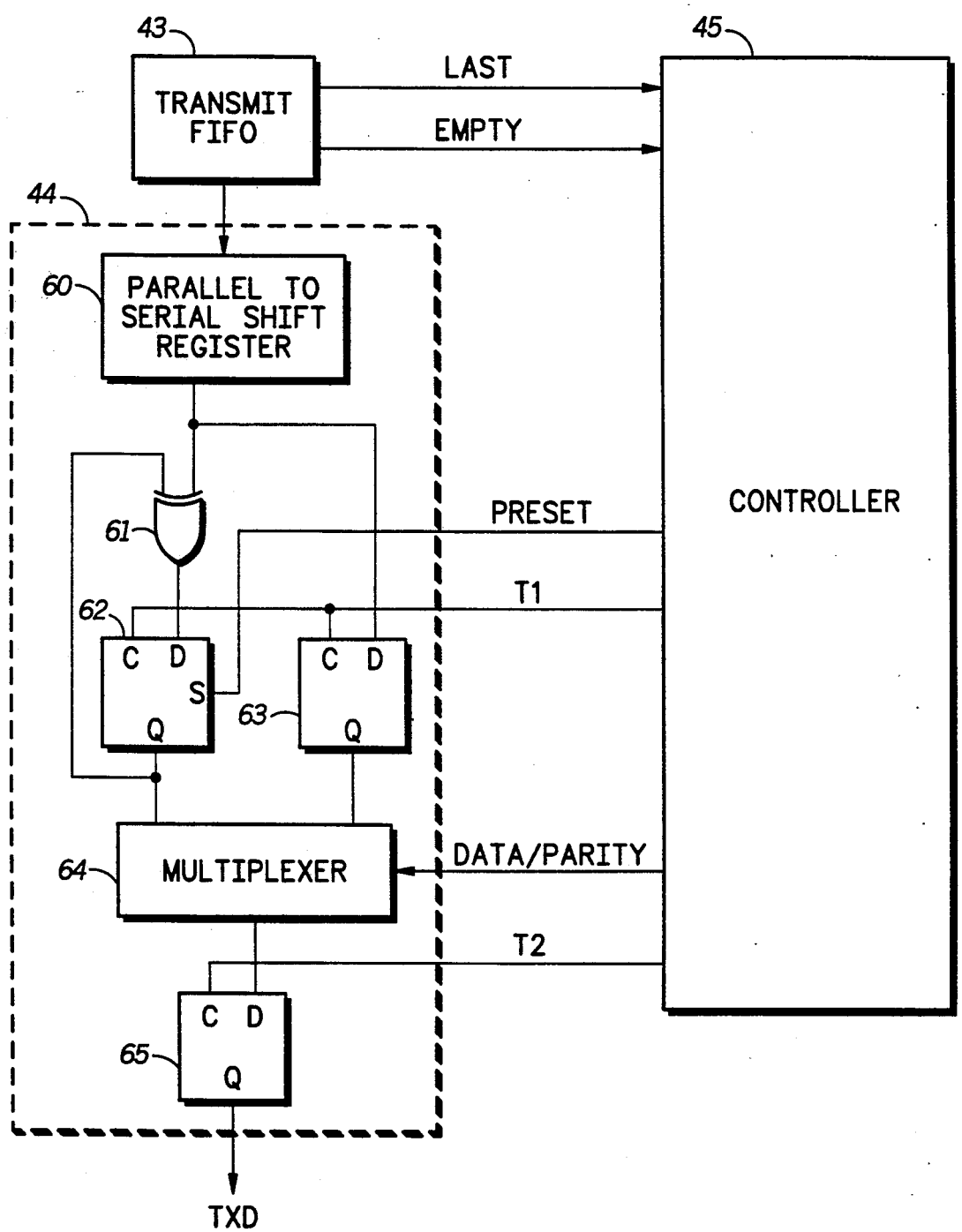
FIG. 6 illustrates in partial schematic form a portion of the serial communication controller of FIG. 3 for implementing the method of the present invention.

FIG. 6 illustrates in partial schematic form a portion of serial communication controller 20 of FIG. 3 for implementing the method of the present invention. Three elements are shown in common with and similarly numbered to corresponding elements in FIG. 3: transmit FIFO 43, parallel-to-serial conversion block 44, and controller 45. Parallel-to-serial conversion block 44 is shown in greater detail as including a parallel-to-serial shift register 60, an exclusive-OR gate 61, a D-type flip-flop 62, a D-type flip-flop 63, a multiplexer 64, and a D-type flip-flop 65.

FIG. 6 shows two interface signals coupled between transmit FIFO 43 and controller 45 pertinent to the current discussion, a last byte indication labelled "LAST", and a FIFO empty indication labelled "EMPTY". Transmit FIFO 43 is coupled to parallel-to-serial shift register 60 and provides a byte of data thereto. Parallel-to-serial shift register 60 in turn provides a serial bit stream as an output. Exclusive-OR gate 61 has a first input terminal for receiving the serial bit stream, a second input terminal, and an output terminal. Flip-flop 62 has an input terminal coupled to the output terminal of flip-flop 61, a clock input terminal for receiving a first clock signal labelled "T1", a preset input for receiving a preset input signal labelled "PRESET", and an output terminal coupled to the second input terminal of exclusive-OR gate 61. Flip-flop 63 has an input terminal for receiving the serial bit stream, a clock input terminal for receiving clock input signal T1, and an output terminal. Multiplexer 64 has a first input terminal coupled to the output terminal of flip-flop 62, a second input terminal coupled to the output terminal of flip-flop 63, and an output terminal. Flip-flop 65 has an input terminal coupled to the output terminal of multiplexer 65, a clock input terminal for receiving a second clock input signal labelled "T2", and an output terminal for providing data output signal TXD.

T1 and T2 are clock signals which are active during high and low times, respectively, of the clock signal provided by clock generator 47 of FIG. 3. Thus, they have a period equal to the period of the clock signal chosen in accordance with the contents of SCC CONFIGURATION REGISTER 30, for example TCLK. Transmit FIFO 43 provides an indication of whether a byte is the last byte to be transmitted through signal LAST, or whether the FIFO is empty through signal EMPTY. If signal EMPTY is active but signal LAST is inactive, then a transmit underrun exception has occurred. But as noted earlier, other exceptions are possible. At the beginning of a frame, controller 45 provides signal PRESET to set the output of flip-flop 62 to a binary one. Then, in response to each successive one in the bit stream provided by parallel-to-serial shift register 60, the state of flip-flop 62 toggles. The output of flip-flop 62 is thus the parity bit, whereas the output of flip-flop 63 is simply the serial data stream. Multiplexer 64 then selects between the output terminals of either flip-flop 62 or flip-flop 63, based on control signal DATA/PARITY. If an exception has occurred, as controller 45 determines at the end of the seventh bit of each byte, then DATA/PARITY becomes inactive, and the output of flip-flop 62 is provided as the eighth bit. Thereafter, flip-flop 65 gates out the serial bit stream modified to include the parity bit, as output signal TXD.

It should be apparent by now that a method for ensuring an erroneous CRC after the occurrence of a transmitter exception has been described. The method relies on the characteristic that CRC generator polynomials with an even number of terms have even parity. A parity bit is preset to a binary one and then toggled in response to each successive binary one. When the transmitter exception is encountered, the first seven bits of the next byte are transmitted, followed by the parity bit. Then, a predefined character with an even number of ones is continuously transmitted. Thus, the receiving station will interpret the predetermined character as the CRC. Assuming no errors on the communication link, this method ensures that the CRC will be interpreted as erroneous by the receiving station and discarded.

While the invention has been described in the context of a preferred embodiment, it will be apparent to those skilled in the art that the present invention may be modified in numerous ways and may assume many embodiments other than that specifically set out and described above. For example, the method applies not only to the DDCMP protocol, but to any byte count protocol using a CRC divisible by (X+1). Furthermore, it should be apparent that other communication controllers for providing the parity bit as the eighth bit of the frame are also possible. Accordingly, it is intended by the appended claims to cover all modifications of the invention which fall within the true spirit and scope of the invention.

We claim:

1. A method for ensuring CRC error generation by a data communication station experiencing a transmitter exception during a transmission of a frame, the frame having a predetermined number of data bytes, comprising the steps of:
   presetting a parity bit to a binary one, said parity bit toggled in response to each successive binary one transmitted by the data communication station;
   transmitting the data bytes of the frame sequentially from a first data byte to a next-to-last data byte, said next-to-last data byte occurring immediately before a last data byte during which the transmitter exception occurs;
   transmitting a first seven data bits of said last data byte;
   transmitting said parity bit in place of an eighth bit of said last data byte; and
   transmitting continuously a predetermined character having even parity until a total number of bytes transmitted is equal to the predetermined number of data bytes plus two, a last two predetermined characters providing an erroneous CRC.

2. The method of claim 1 wherein said predetermined character is a SYNC character.

3. The method of claim 1 wherein said predetermined character is an IDLE character.

4. A method for ensuring CRC error generation by a data communication station experiencing a transmitter exception during a transmission of a frame, the frame having a predetermined number of data bytes, comprising the steps of:
   presetting a parity bit to a binary one, said parity bit toggled in response to each successive binary one transmitted by the data communication station;
   transmitting a first seven bits followed by an eighth bit of each successive byte of the frame if the transmitter exception has not occurred before said eight bit of the corresponding byte is transmitted;
   transmitting said first seven bits of a byte of the frame if the transmitter exception has occurred before said eighth bit of the corresponding byte is transmitted;
   transmitting said parity bit; and
   transmitting continuously a predetermined character having even parity until a total number of bytes transmitted is equal to the predetermined number of data bytes plus two, a last two predetermined characters providing an erroneous CRC.

5. A communication controller of a data communication station, implementing a predetermined protocol, comprising:
   a first-in, first-out memory having a data input for receiving input data, a data output, and a control output port for indicating an underrun condition;
   a parallel-to-serial shift register having an input coupled to said data output of said first-in, first-out memory, and an output;
   a parity bit generator having a data input coupled to said output of said parallel-to-serial shift register, a preset input for receiving a preset signal, and an output;
   a multiplexer having a first input coupled to said output of said parity bit generator, a second input coupled to said output of said parallel-to-serial shift register, a control input terminal for receiving a data/parity signal, and an output for providing a transmit data output signal; and
   a controller coupled to said first-in, first-out memory, to said parity bit generator, and to said multiplexer, for providing said preset signal to said parity bit generator as a beginning of a predetermined portion of a frame, and for providing said data/parity signal to select said first input of said multiplexer during an eighth bit of a byte in response to said first-in, first-out memory indicating said underrun condition.

6. The communication controller of claim 5 wherein the predetermined protocol specifies the transmission of a cyclic redundancy check having even parity at an end of a portion of a data frame.

7. The communication controller of claim 6 wherein the predetermined protocol is DDCMP.

8. The communication controller of claim 5 wherein said parity bit generator comprises:
   a exclusive-OR gate having a first input coupled to said output of said parallel-to-serial shift register, a second input, and an output; and
   a flip-flop having an input terminal coupled to said output terminal of said exclusive-OR gate, a clock input terminal for receiving a clock signal, a preset input terminal for receiving said preset signal, and an output terminal coupled to said second input terminal of said exclusive-OR gate and to said first input terminal of said multiplexer.

* * * * *

UNITED STATES PATENT AND TRADEMARK OFFICE
CERTIFICATE OF CORRECTION

PATENT NO. : 5,195,093
DATED : March 16, 1993
INVENTOR(S) : Moshe Tarrab, et al.

It is certified that error appears in the above-identified patent and that said Letters Patent is hereby corrected as shown below:

Column 12, line 13, change "eight" to --eighth--
Column 12, line 59, change "a exclusive-OR" to --an exclusive-OR--

Signed and Sealed this

Eighteenth Day of January, 1994

Attest:

BRUCE LEHMAN

Attesting Officer

Commissioner of Patents and Trademarks